May 19, 1942.  E. W. FAVALORA  2,283,799
HANDICAPPING DEVICE
Filed April 5, 1940   2 Sheets-Sheet 1
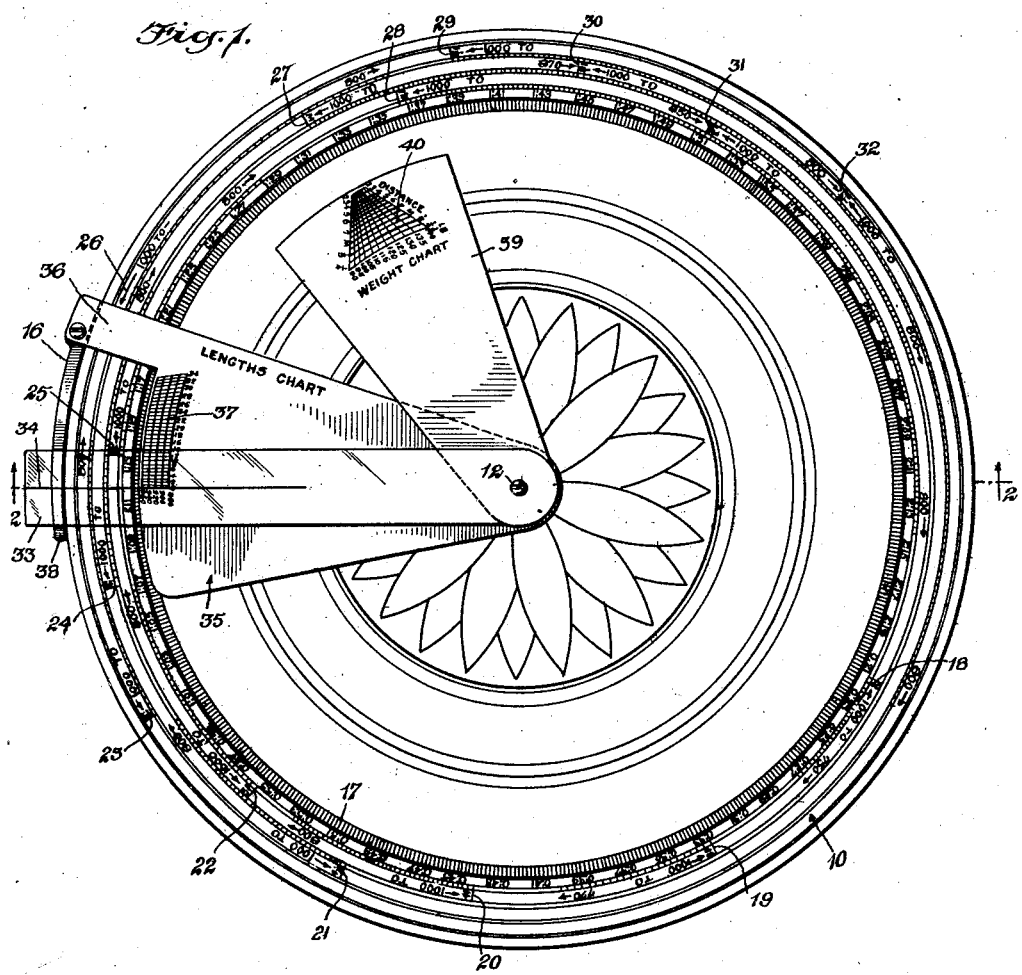
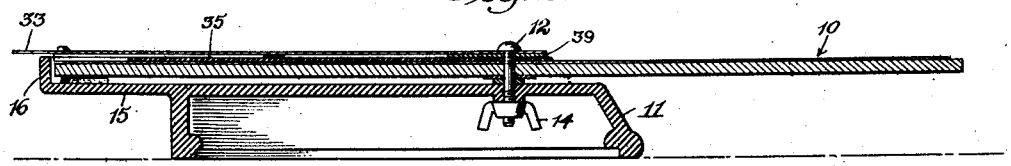
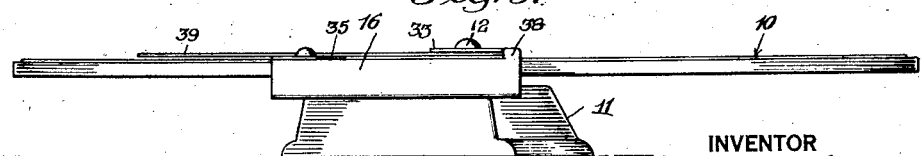
WITNESSES
INVENTOR
Emile W. Favalora
BY
ATTORNEYS May 19, 1942.  E. W. FAVALORA  2,283,799
HANDICAPPING DEVICE
Filed April 5, 1940   2 Sheets-Sheet 2

WITNESSES
INVENTOR
Emile W. Favalora
BY
ATTORNEYS

Patented May 19, 1942

2,283,799

UNITED STATES PATENT OFFICE 2,283,799

HANDICAPPING DEVICE

Emile W. Favalora, New York, N. Y.

Application April 5, 1940, Serial No. 328,015

2 Claims. (Cl. 235—83)

This invention relates to an improved handicapping device for use in handicapping and evaluating the relative merits of race horses or the like.

It is an object of the invention to provide an improved device of the above character which will readily enable the user to handicap or to judge a race horse or other racing animal on the basis of his past performance.

In connection with race horses and other racing animals, it is customary to provide information with regard to the past performance of the animal. This information includes the length of the race, the time in which it was run, the number of lengths of the horse behind the winner and also the amount of weight which the horse carried.

Heretofore, attempts have been made to provide devices for handicapping and judging horses on the basis of their past performances. However, these devices have been unsatisfactory and inaccurate in many respects. Thus many of the devices have assigned an arbitrary value to the number of lengths behind the winner of the horse being judged, regardless of the speed in which the race was run. Also many of the devices assigned an arbitrary value to variations in weight regardless of the total amount of weight carried and regardless of the length of the race.

It is an object of the invention to overcome the difficulties heretofore encountered in this respect and to provide an improved handicapping device which will enable the user to handicap and judge with a reasonable degree of accuracy the relative merit of a horse on the basis of its past performance and which will take into consideration the number of lengths of the horse behind the winner and also the variation of weight carried by the horse, with due allowance for the speed of the race, the length of the race and the total amount of weight carried. In this connection, I have found that when a race is run at a relatively fast rate of speed, the number of lengths of the horse behind the winner is of lesser or shorter time value than a correspondingly number of lengths in a relatively slower race. I have also found that in most instances an increase in weight in a relatively long race is of more significance or importance than a corresponding increase in weight in a relatively short race and also that an increase in weight, where a relatively large load is being carried by the horse, is of more significance or importance than a corresponding increase in weight where a relatively small load is being carried.

My present invention takes these factors into consideration and includes improved compensators which take into consideration the variations in speed in prior races when compensating for the number of lengths which the horse was behind the winner and which also takes into consideration variations in lengths of races and variations in the total amount of weight carried when compensating for variations in weight.

In the accompanying drawings—

Fig. 1 is a plain view of a handicapping device embodying my invention;

Fig. 2 is a sectional view in the direction of the arrows on line 2—2 of Fig. 1;

Fig. 3 is a side elevation of the device;

Figure 4:
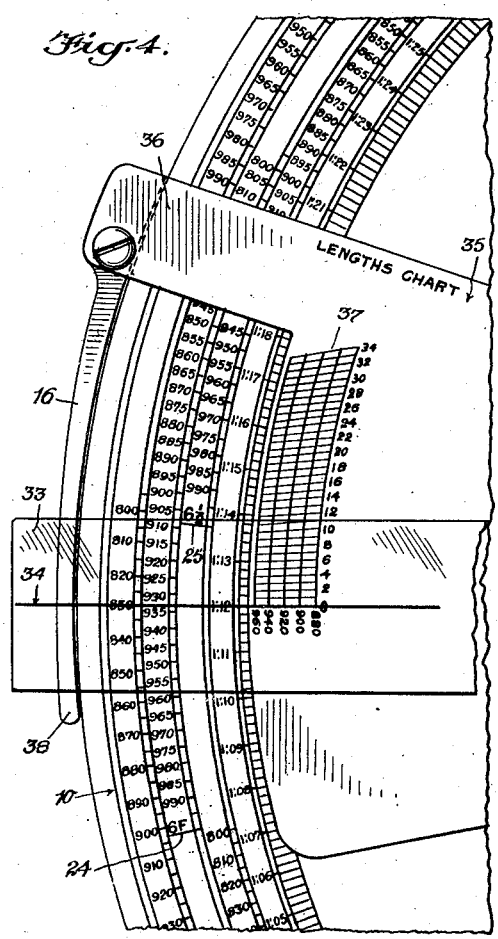
Fig. 4 is a detailed view showing the first step in using my device.

My handicapping device briefly comprises a circular disk 10 pivotally mounted on a base 11 as by means of a suitable pivot as for instance the screw 12 having a wing nut 14 whereby the pivotal connection may be adjusted. The base 11 is provided with a radial extension 15 with an arcuate upstanding flange 16 positioned adjacent and extending above a portion of the peripheral edge of the disk and having a stop 88 in the form of a lug projecting upwardly from one end thereof.

Figure 5:
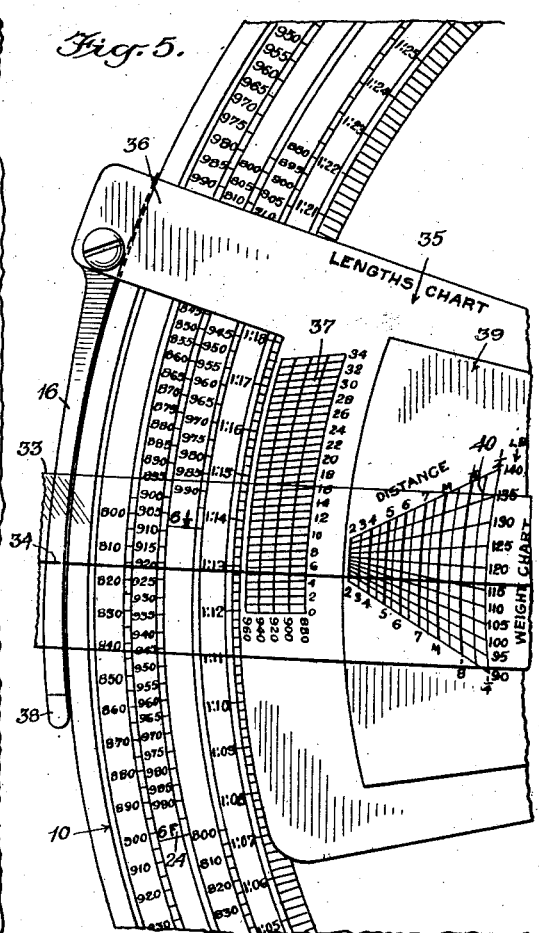
Fig. 5 is a similar view showing the second and third steps in using my device.
Figure 6:
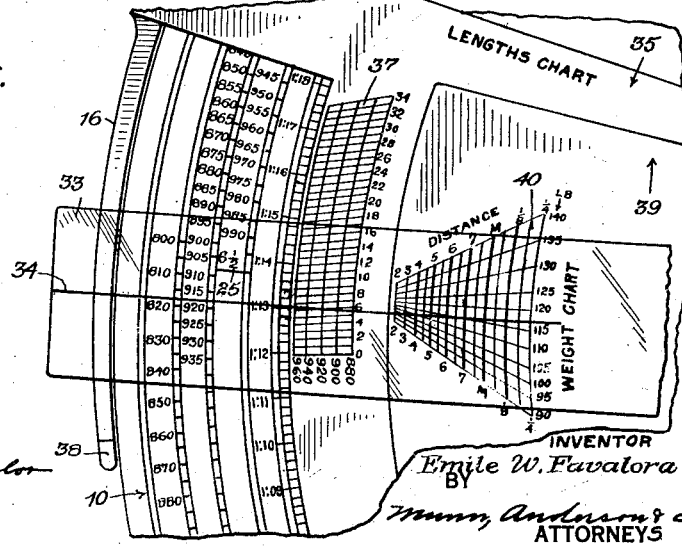
Fig. 6 is a similar view showing the final step in using my device.

The face of the disk may be provided with suitable ornamentation as shown and is also provided with a plurality of circular or arcuate tables, positioned adjacent and arranged concentric with the periphery thereof. The innermost of the series of tables, indicated by the number 17, represents a time chart in which each marking represents one-fifth of a second. The time chart extends completely around the disk and should represent the range of time periods required to run the several lengths of races for which the device is designed. In the present instance the device is designed to use in connection with horse races from two furlongs to one mile and a quarter in length and accordingly the time markings extend from twenty seconds up to two minutes and 19 seconds as indicated. As shown, the time chart is preferably provided with a plurality of small markings, each representing one-fifth of a second and each second is indicated by a longer marking. Adjacent each of the markings representing the seconds, I preferably provide numerals indicating the time in minutes and seconds and these are preferably arranged in radial fashion as shown in Figs. 4–6. For the sake of clarity, I have merely indicated the numerals for every other second in Fig. 1 and they are shown as arranged in arcuate rather than radial fashion.

In the space outside of the time chart, I have provided a plurality of concentric bands in which I have provided charts representing the various lengths of races, the chart for each length race being positioned adjacent the portion of the time chart in which that length race is generally run. I rate and compare the relative ability of race horses by assigning to them numbers having arbitrary predetermined values, ranging downwardly from a theoretically perfect rating of 1000. In each of the charts for the various lengths races, I have provided a series of small markings, each marking differing in value from the preceding or succeeding marking by the same amount. In each chart the theoretically perfect value for the fastest time in which the race could be run is 1000 and each successive marking represents a decrease in rating by a fixed amount.

In computing the charts, it is necessary to compare the performances of horses of various merits in different length races and in each length race a theoretically perfect time is computed and the value of 1000 is arbitrarily assigned to a horse performing in that time. As a practical matter, no horse actually performs in a theoretically perfect time and for that reason all horses will have a lower rating. By means of a similar comparison, a value of 900 and of 800 and of all intermediate points can be assigned to the time performance of horses in various lengths races.

In the handicapping device shown in the accompanying drawings, it will be seen that I have provided a chart 18 representing a two furlong race, a chart 19 representing a three furlong race, a chart 20 representing a four furlong race, a chart 21 representing a four and one-half furlong race, a chart 22 representing a five furlong race, a chart 23 representing a five and one-half furlong race, a chart 24 representing a six furlong race, a chart 25 representing a six and one-half furlong race, a chart 26 representing a seven furlong race, a chart 27 representing a mile race, a chart 28 representing a one-seventy race, a chart 29 representing a mile and one-sixteenth race, a chart 30 representing a mile and one-eighth race, a chart 31 representing a mile and three-sixteenths race, and a chart 32 representing a mile and a quarter race.

On the basis of my calculations and experience I have found that satisfactory results are obtained by assigning the following time values to the rating numerals in the various length races. In the two furlong race a theoretically perfect rating of 1000 is assigned to the time of twenty-one and four-fifths seconds and a rating of 750 is assigned to twenty-seven and two-fifths seconds. The intermediate portion of the two furlong chart between these two points is equally divided and the intermediate markings assigned thereto.

In the three furlong race a theoretically perfect rating of 1000 is assigned to thirty-three seconds and a rating of 770 is assigned to forty and three-fifths seconds with the intermediate portions of the three furlong charts equally divided into intermediate markings.

In the four furlong race the theoretically perfect rating of 1000 is assigned to forty-four and one half seconds and a rating of 800 is assigned to fifty-three and one half seconds with the intermediate portions of the chart equally divided into intermediate markings.

In the four and one-half furlong race a theoretically perfect rating of 1000 is assigned to fifty and two-fifths seconds and the rating of 800 is assigned to one minute and three-fifths of a second, with the intermediate portions of the chart equally divided into intermediate markings.

In the five furlong race the theoretically perfect rating of 1000 is assigned to fifty-five and four-fifths seconds and a rating of 800 is assigned to one minute, seven and one fifth seconds with the intermediate portions of the chart equally divided into intermediate markings.

In the five and one-half furlong race the theoretically perfect rating of 1000 is assigned to one minute, one and two-fifths seconds and a rating of 800 is assigned to one minute, thirteen and four fifths seconds with the intermediate portions of the chart equally divided into intermediate markings.

In the six furlong race the theoretically perfect rating of 1000 is assigned to one minute, seven and two-fifths seconds and the rating of 800 is assigned to one minute, twenty-one and one-fifth seconds with the intermediate portions of the chart equally divided into intermediate markings.

In the six and one-half furlong race the theoretically perfect rating of 1000 is assigned to one minute, thirteen and seven-tenths seconds and the rating of 800 is assigned to one minute, twenty-eight and seven-tenths seconds with the intermediate portions of the chart equally divided into intermediate markings.

In the seven furlong race the theoretically perfect rating of 1000 is assigned to one minute, nineteen and four-fifths seconds and the rating of 800 is assigned to one minute and thirty-six seconds with the intermediate portions of the chart equally divided into intermediate markings.

In the mile race, the theoretically perfect rating of 1000 is assigned to one minute, thirty-two and one tenth seconds and the rating of 870 is assigned to one minute, forty-four and three-tenths seconds with the intermediate portions of the chart equally divided into intermediate markings.

In the one-seventy race, the theoretically perfect rating of 1000 is assigned to one minute, thirty-six and two-fifths seconds and the rating of 850 is assigned to one minute, fifty and four-fifths seconds with the intermediate portions of the chart equally divided into intermediate markings.

In the mile and sixteenth race, the theoretically perfect rating of 1000 is assigned to one minute, thirty-nine and one-fifth seconds and the rating of 815 is assigned to one minute, fifty-seven and two-fifths seconds with the intermediate portions of the chart equally divided into intermediate markings.

In the mile and one-eighth race, the theoretically perfect rating of 1000 is assigned to one minute, forty-five and four-fifths seconds and the rating of 800 is assigned to two minutes, six and one-fifth seconds with the intermediate portions of the chart equally divided into intermediate markings.

In the mile and three-sixteenths race, the theoretically perfect rating of 1000 is assigned to one minute, fifty-one and five-tenths seconds and the rating of 800 is assigned to two minutes, fourteen and three-tenths seconds with the intermediate portions of the chart equally divided into intermediate markings.

In the mile and a quarter race, the theoretically perfect rating of 1000 is assigned to one minute, fifty-eight seconds and the rating of 800 is assigned to two minutes, twenty-two and one-fifth seconds with the intermediate portions of the chart equally divided into intermediate markings.

The values indicated as stated above are arbitrary but are of the same proportional value in races of different lengths. It should be understood, of course, that different systems of evaluation may be employed and that corrections in the valuations may have to be made from time to time as the performance of horses in races of different lengths change. However, in all instances it is important that the rating numerals be of comparable value in the races of different lengths so that it will be possible to handicap or judge a horse for a race of a particular length on the basis of his performance in races of other lengths.

The rating numerals are preferably placed adjacent each of the markings in charts 18 to 32 as shown in Figs. 4–6. For the sake of clarity the specific numerals have been omitted from Fig. 1 and I have merely indicated the numerical range of each chart.

In using my device to handicap a horse or evaluate his merit on the basis of his past performance it is necessary to ascertain the length of the prior race and the time in which it was run. Reference is then made to the time on the time chart and then to the rating numeral adjacent the time marking located in the chart for the particular length race under consideration. If the horse being handicapped or judged was first in the race and accordingly no compensation for the number of lengths behind the winner has to be made and if no compensation has to be made for variation in weight carried the rating numeral accurately indicates the rating value of the horse. Thus, by way of example, we may refer to Fig. 4 and it will be noticed that if a horse was the winner in a six furlong race run in one minute and twelve seconds, he has a rating value of approximately 935 in any future race in which he carries the same amount of weight. By referring to the same figure it will also be seen that if a horse won a six and one-half furlong race in one minute, seventeen, and four-fifths seconds, he would have a rating of approximately 945 in any future race in which he carries the same amount of weight.

So as to facilitate the reading of the chart, I provide an indicator 33 in the form of a transparent strip made of Celluloid, cellulose acetate, or similar material pivotally mounted to the center screw 12 and having a radially disposed indicating line 34 formed thereon whereby the proper rating numeral positioned adjacent any particular time marking may be accurately determined.

The mechanism heretofore described is perfectly satisfactory for handicapping or indicating the relative merit of a horse on the basis of his past performance where he was the winner in prior races and where he will carry the same amount of weight in future races as in past races. However, as a practical matter, a horse does not win all of his races and does not always carry the same amount of weight and for this reason I have provided compensating devices for compensating for the number of lengths behind the winner and for compensating for variations in weight. Thus I have provided a lengths compensating device 35 which is segmental in shape, made of sheet material such as cellulose acetate, and is pivotally mounted and is provided at its outer portion with a projecting strip 36 which is connected with the upstanding flange 16 formed on the base.

I have previously stated that the time value of a length in a slow race is greater than the time value of a length in a fast race. Thus it will be appreciated that if a length is approximately nine feet it will take a horse longer to run two or three lengths in a slow race than in a fast race. In my lengths compensating chart I have taken his factor into consideration and greater time value is credited to a length in connection with a horse having a rating of approximately 880 than in connection with a horse having a rating of 960. It will be appreciated that where extreme accuracy is desired, a separate lengths compensating chart may be provided for races of various lengths and accurate time values may be assigned to a length for each of the rating values. However, in most instances, such extreme accuracy is not required and a chart in which the values are computed on the basis of a race of intermediate length, say approximately a mile or so, will serve satisfactorily. The formula for computing the lengths chart is $$L = \frac{9T}{D}$$

where L represents one length, D represents the distance of the race in feet, and T represents the time in seconds.

In the present instances, I have provided a lengths compensating chart 37 on the device 35 which serves satisfactorily for the various lengths races embodied in the illustrated device. Thus it will be seen that I have provided a plurality of evenly spaced arcuate lines concentric with the center of the disk and representing the rating values 880, 900, 920, 940, and 960 respectively. The lines are of graduated length, the line representing the lowest value being of the greatest length and the line representing the highest rating value being of shortest length. Lines representing all of the rating values may be provided. However, for practical purposes it is only necessary to provide lines for the rating values of 880 to 960 as most horses fall within this classification.

In the present instances, the line representing 960 is equivalent in length to approximately five and three-fifths seconds on the time chart and the line representing 880 is equivalent in length to approximately six and two-fifths seconds on the time chart with the intermediate lines being of graduated length. Each of the lines is in turn divided into thirty-four equally spaced markings which may be numbered as shown from zero to thirty-four, each of the markings representing the value of one length. Thus it will be seen that a length in the line representing a rating value of 880 is of greater time value than one length on the other lines and that the time value of one length gradually decreases as the rating value increases.

As previously stated the relative time values attributed to each length for horses of various ratings in the lengths compensation chart have been calculated on the approximate basis of a race of intermediate length and serves quite satisfactorily in connection with the various length races shown on the illustrated handicapping device.

However, if desired, a compensating chart having accurate calculations, on the basis of the rating values and speeds in each individual race may be provided where extreme accuracy is desired.

In using the lengths compensating chart the general rating value of the horse is first calculated on the basis of the length of the race and the speed in which it was run. Thus in a six furlong race run in one minute and twelve seconds it will be ascertained as shown in Fig. 4 that the rating value of the horse is approximately 935. In this connection the indicating strip 33 should be placed against the stop 38 which is provided on flange 16 and the disk 10 should be rotated until the indicating line 34 extends over the marking for the time one minute and twelve seconds as shown in Fig. 4. Due to the engagement between the indicating strip and the stop 38 the indicating line 34 will be superimposed on the line representing zero in the lengths chart. If in the race under consideration the horse being handicapped was five lengths behind the winner the next step in determining the rating value of the horse is indicated in Fig. 5. Thus it will be seen that the lengths compensating device 35 and the disk 10 are held in fixed relationship and the indicating strip 33 is shifted circumferentially until the indicating line 34 passes over the theoretical point of intersection between the line representing five lengths and the imaginary line representing a rating of 935 which would be positioned between 920 and 940. The indicating line 34 will no longer point to a rating value of approximately 935 but instead will now point to a rating value of approximately 920 due to the compensation for the fact that the horse was five lengths behind the winner.

It will also be appreciated as stated above that in many races horses carry varying weights and it is necessary to compensate for the variations in weights. For this purpose I provide a weight compensating device 39 having a chart 40 thereon whereby the operator may compensate for variations in weight at the same time taking into consideration variations in the length of the race and the difference in the total weight carried by the horse. I have previously pointed out that in most instances an increase in weight will have a more serious consequence on the speed of the horse in a long race than in a short race and also that where the horse is already carrying a relatively heavy weight, a further increase in weight affects the speed of the horse more seriously than in those instances where he is carrying a relatively light weight.

In my weight compensating chart which is shown most clearly in Figs. 5 and 6, I have taken both of these factors into consideration. Thus it will be seen that I have provided a series of arcuate lines representing the various length races for which the handicapping device is designed from two furlongs up to a mile and one quarter. It will be seen that the line representing one mile and one quarter is substantially longer than the line representing two furlongs and the intermediate lines are of graduated lengths. Each of the lines in turn are divided into divisions of various lengths representing the weights carried by the horse. Eleven different graduations representing weights increasing by five pounds from 90 to 140 pounds are embodied in the illustrated weight compensating chart and the divisions in the different lines are connected together in the manner shown. The spacing or graduations between the higher weights are substantially larger than the spacings or graduations between the lower weights.

On the basis of calculation and observation, I have observed that an increase of 50 pounds from 90 to 140 pounds in a two furlong race retards the average race horse for approximately the equivalent of five lengths while in a mile and one quarter race, a similar increase of 50 pounds of weight carried from 90 to 140 pounds retards the average race horse for the equivalent of approximately 34 lengths and accordingly in my chart I have made the line representing two furlongs on the weight compensating chart the equivalent in length to approximately five lengths in the weight compensating chart and I have made the line representing a mile and one quarter race on the weight compensating chart equivalent in length to approximately 34 lengths on the length compensating chart, and the lines representing the intermediate lengths races are graduated in proportion to the length of the race. In this connection it will be noted that in the lengths compensating chart the value of a length in the line representing 880 is greater than the value of a length in the line representing 960 and for extreme accuracy a separate weight compensating chart may be provided for each rating value. However, in most instances, such extreme accuracy is not necessary and the length of the line in the weight compensating chart may be computed on the basis of the lengths represented by the intermediate rating value line 920 in the lengths compensating chart and in the illustrated embodiment the weight compensating chart has been computed on this basis.

With regard to the spacing between the weight divisions on the weight compensating chart, I have found that the distance between the markings representing 135 and 140 pounds should be twice as great as the distance between the markings representing 90 and 95 pounds, and the distance between the intermediate divisions should be of graduated value.

As an illustration of the manner in which the weight compensating device is utilized, we may again refer to the example given above in which a horse in a previous race ran five lengths behind the winner in a six furlong race in which the winning time was one minute and twelve seconds. We may assume for the purpose of illustration that in the previous race he carried 110 pounds and in the new race in which he is to run he will carry 115 pounds.

As previously stated, the first step in calculating the rating of the horse is to place the indicating strip 33 in contact with stop 38 and to rotate disk 10 until indicating line 34 is disposed above the time marking, representing one minute and twelve seconds. The rating value for the weight of that race is then approximately 935. It will be seen that the indicating line 34 is superimposed upon the zero lengths line in the lengths chart. The lengths compensating device 35 and the disk 10 are held in fixed relationship and indicating device 33 is shifted until the indicating line 34 is superimposed over the theoretical point of intersection between the line representing five lengths and the theoretical line representing 935 on the lengths chart. It will be seen that the approximate rating value of the horse is then 920. However, it is still necessary to compensate for the difference in weight. To do this, the weight compensating device 39 is interposed between the indicating device 33 and the lengths compensating device so that the indicating line 34 is superimposed over the point of intersection between the six furlong line and the 110 pound line on the weight compensating chart. The weight compensating device, the lengths compensating device and the disk will then be held in fixed relationship and the indicating device 30 is circumferentially shifted until the indicating line 34 is superimposed over the point of intersection between the line representing six furlongs and the line representing 115 pounds on the weight compensating chart. Indicating line 34 will then point to approximately midway between the ratings of 915 and 920 on the rating chart which represents the rating figure of the horse in the race in which he is to run.

By rating the other horses in the race on the basis of their previous performance a rating figure can be obtained for each of the horses in a coming race and their comparative merits can be evaluated. It will be appreciated of course that the rating values of a horse on the basis of his past performance in several races may be calculated and the several rating values if they are not the same can be averaged so as to give a more accurate rating.

From the foregoing description, it will be appreciated that I have provided an improved handicapping device for handicapping and judging the comparative merit of race horses or similar racing animals on the basis of their past performance. It will also be appreciated that my improved device compensates for the number of lengths behind the winner and also for variations in the weight carried by the horse and in this connection due consideration is given to the relative speed of the race, the relative length of the race, and the total weight carried by the horse.

It should be understood, of course, that variations may be made in the illustrated and described embodiment of my invention without departing from the invention as set forth in the accompanying claims.

I claim:

1. A handicapping device for judging and handicapping horses on the basis of their past performance comprising a member having a plurality of racing charts thereon, each representing a race of a different length and each having a plurality of rating values indicated thereon in sequential order, the rating values of the different charts being of similar value; a time chart positioned adjacent the racing charts and having time markings arranged thereon in chronological order, the time markings adjacent each racing chart representing the average times in which a race of that length is run; an indicating device shiftable along the racing and time charts and having an indicating marking thereon whereby the rating value of a horse running a race of predetermined length at a predetermined time may be calculated; a lengths compensating device positioned adjacent and shiftable relative to the racing and time charts and having a lengths compensating chart thereon provided with markings representing the average time required for horses of different rating values to run a predetermined number of lengths; the markings for a horse of relatively lower rating value being spaced a greater distance apart than the markings of a horse of a higher rating value; and a weight compensating device adjacent and shiftable relative to the other charts and provided with a weight compensating chart having a plurality of markings representing the average number of lengths lost by a horse in races of different predetermined lengths upon increasing the relative amount of weight carried by the horse, the said markings in the weight compensating chart being spaced a greater distance apart in races of greater length and where the relative amount of weight carried by the horse is greater.

2. A handicapping device as set forth in claim 1 in which the length compensating device is provided with a stop for engaging the indicating device so as to normally hold it in a position with the indicating marking postioned at the beginning of the lengths compensatng chart.

EMILE W. FAVALORA.